US005544274A

United States Patent [19]

Walker et al.

[11] Patent Number: 5,544,274

[45] Date of Patent: Aug. 6, 1996

[54] ELECTRICAL ARRANGEMENT IN POWER TOOLS—POWER TOOL WITH SLIDE SWITCH

[75] Inventors: Andrew Walker, Newton Aycliffe; Steven Swaddle, Chester-Le-Street, both of United Kingdom

[73] Assignee: Black & Decker Inc., Newark, Del.

[21] Appl. No.: 345,976

[22] Filed: Nov. 25, 1994

Related U.S. Application Data

[63] Continuation of Ser. No. 913,334, Jul. 15, 1992, abandoned.

[30] Foreign Application Priority Data

Jul. 19, 1991 [GB] United Kingdom .................. 9115603

[51] Int. Cl.$^{6}$ .................................................. H02P 7/288

[52] U.S. Cl. .......................... 388/838; 388/937; 15/412; 200/61.72; 200/252

[58] Field of Search .................................... 388/825, 833, 388/838, 937; 310/139, 343, 553.4; 15/DIG. 1, 300.1, 347, 410, 412; 200/1 R, 61.5, 812, 61.62, 61.71, 61.72, 237, 238, 241, 243, 247, 252, 254

[56] References Cited

U.S. PATENT DOCUMENTS

| | | | |
|---|---|---|---|
| 3,223,794 | 12/1965 | Hoy et al. . | |
| 3,257,599 | 6/1966 | Somers et al. . | |
| 3,555,213 | 1/1971 | Cherry et al. . | |
| 3,651,287 | 3/1972 | Rubenstein . | |
| 4,052,573 | 10/1977 | Kojima et al. . | |
| 4,164,670 | 8/1979 | Maher | 310/50 |
| 4,307,485 | 12/1981 | Dessig . | |
| 4,357,729 | 11/1982 | Molen et al. | 15/319 |
| 4,421,964 | 12/1983 | Buchtel | 200/157 |
| 4,491,703 | 1/1985 | Jaklic . | |
| 4,577,365 | 3/1986 | Yuen | 15/339 |
| 5,035,024 | 7/1991 | Steiner . | |

FOREIGN PATENT DOCUMENTS

| | | |
|---|---|---|
| 0138655 | 2/1986 | European Pat. Off. . |
| 1114785 | 5/1968 | France . |
| 734133 | 4/1943 | Germany . |
| 1150432 | 6/1963 | Germany . |
| 7503265 | 8/1976 | Germany . |
| 3540898 | 5/1986 | Germany . |
| 3604675 | 8/1987 | Germany . |
| 3805060 | 8/1989 | Germany . |
| 1071695 | 6/1967 | United Kingdom . |
| 1247314 | 9/1971 | United Kingdom . |
| 1290770 | 9/1972 | United Kingdom . |
| 1363652 | 8/1974 | United Kingdom . |
| 1383020 | 2/1975 | United Kingdom . |
| 1447632 | 8/1976 | United Kingdom . |
| 1448308 | 9/1976 | United Kingdom . |

*Primary Examiner*—David S. Martin
*Attorney, Agent, or Firm*—Barry E. Deutsch

[57] ABSTRACT

A power tool such as a hand held vacuum cleaner, has a housing and nozzle. The housing mounts a motor and switch carrier. A battery pack powers the motor. The electrical arrangements comprise conductors punched from a single strip and fixed in guides formed on the carrier. Terminals of the motor and battery are pressed through slits in some conductors. The conductors pass into tracks formed on a tray of the switch. A mask is positioned on the tray to expose the conductors in discrete switch positions of slide connectors mounted in a switch slide slidably mounted on the tray. A mask (78) is positioned on the tray to expose the conductors in discrete switch positions (A, B, C) of slide connectors (68) mounted in a switch slide (64) slidably mounted on the tray.

17 Claims, 5 Drawing Sheets

ELECTRICAL ARRANGEMENT IN POWER TOOLS—POWER TOOL WITH SLIDE SWITCH

This is a continuation of application Ser. No. 07/913,334 filed on Jul. 15, 1992 abn.

FIELD OF THE INVENTION

The present invention relates to power tools, and particularly to an electrical arrangement for a power tool having a housing mounting a power source, switch and motor, for example, cordless hand held vacuum cleaners. The invention also relates to switches, particularly for such tools.

BACKGROUND OF THE INVENTION

A power tool comprises three basic elements, namely an electrical power source, a switch and an electric motor, the switch being actuable to connect and disconnect the electrical power to the motor. The motor is arranged to drive some tool for performing operations.

The power source, switch and motor are generally interconnected by sheathed wiring, as this is the simplest arrangement in terms of design. However, it does not lend itself to efficient automatic assembly and usually this has to be done by human operators intervening in an otherwise human-free assembly line. It is known to use other than flexible sheathed wires and many products employ rigid conductors bent and formed to follow a particular path and this eases automatic assembly. Nevertheless, these are difficult to design and must be done individually for each product.

As mentioned above, the present invention is primarily concerned with, although not limited to, cordless hand held vacuum cleaners in which the power source is a battery pack. In all practical situations the batteries are rechargeable. Also new regulations are being introduced to require rechargeable battery packs to be relatively simply removed for recycling purposes (and to avoid environmental contamination) when the cleaner is finally disposed of at the end of its working life. In a vacuum cleaner the "tool" which is driven by the motor is a fan impellor which produces the vacuum for effecting the cleaning operation. In addition there is, of course, a housing mounting the various components and having a nozzle in communication with the fan impellor and some collecting means for retaining the dust, debris or liquid sucked through the nozzle. A handle of some description will also be provided.

Nevertheless, it is an object of the present invention to provide an electrical arrangement for a power tool generally which is simple to assemble and disassemble, which lends itself to automatic assembly in its construction, and is flexible in its application to different embodiments of the tool.

SUMMARY OF THE INVENTION

The present invention is characterised in that it comprises a motor and switch carrier member of insulative material and mounting on one side thereof one end of the motor, and having apertures through which electrical terminals of the motor protrude; guides being formed in side by side relation on the other side of the carrier in which are located conductors punched from a strip of electrically conductive material and lying in said guides in substantially the same disposition as they lay in said strip before punching, and to first and second of said conductors said terminals of the motor are connected, said first conductor leading to said switch mounted on the carrier and said second conductor leading to the power source, a third conductor connecting said switch and power source.

Preferably said first and second conductors are slit and through which slits said terminals of the motor are pressed to complete the connections therebetween.

Preferably said first and third conductors pass into tracks in the switch and form terminals thereof wherein a slide connector in the switch makes and breaks electrical connection between said first and third conductors.

Preferably said carrier has means for slidably mounting a switch slide of insulative material in which said slide connector is fixed, said switch slide being slidable along a line generally parallel with the line of said first and third conductors.

Preferably said power source is a pack of rechargeable batteries rather than, for example, leads from a mains ac supply, and in which event said motor is a dc motor.

In this case a fourth conductor is preferably provided in a further guide in the carrier and which is punched from the same strip, which conductor is disposed between the switch and an aperture in the housing for receiving terminals of a battery charger, said second conductor having a branch to said aperture, and said slide connector in a first position thereof electrically bridging said third and fourth conductors and isolating said first conductor and in a second position thereof electrically bridging said first and third conductors and isolating said fourth conductor.

Where a battery pack is provided, it is sometimes the case that high and low power is required and in this event said second conductor leads to an end of the stack of batteries forming said pack while said third conductor leads to an intermediate point in said stack, a fifth conductor being provided in a yet further guide in the carrier and being punched from the same strip, which fifth conductor is disposed between said switch and the other end of said battery stack, the switch having a third position in which said first and fifth conductors are electrically bridged. On the other hand, said third conductor could lead to said other end of the battery stack while the fifth conductor leads to said intermediate point, the switch positions being adjusted accordingly.

Additionally or alternatively, it is sometimes the case that an auxiliary device should be powered by the same power source and in which event there is provided a sixth conductor disposed in a still further guide in the carrier and being punched from the same strip, which conductor is disposed between said switch and a first terminal for said auxiliary device, a second terminal thereof leading to said second conductor, the switch having a fourth position in which said sixth and third conductors are electrically bridged to power said auxiliary device.

Although not limited to vacuum cleaners, the aforementioned two features have particular application to cleaners where it is desirable to have dual power performance and in which the auxiliary device is an electrically powered, motor driven brush mounted at the end of the nozzle. In this case it is desirable to have a three position switch in which the first position is "Off" (battery charging), the second position is "On-I" (low power, battery charger isolated and the power brush optionally on full power) and the third position is "On-II" (full power, battery charger isolated and the power brush on full power as well).

Thus it is preferred that said third conductor is connected to said other end of the battery stack while said fifth conductor is connected to said intermediate point, the switch in said first position electrically bridging said third and fourth conductors, all others being isolated, in said second position electrically bridging said first and fifth conductors and, optionally, said third and sixth conductors, all others being isolated, and in said third position electrically bridging said first, third and sixth conductors, all others being isolated.

As mentioned above said switch includes tracks into which said first and third conductors extend. It will be apparent from the foregoing that as each further conductor is added as additional features are employed, corresponding tracks and conductors extend into the switch.

In its simplest form the switch comprises just two tracks for said first and third conductors, but in a first preferred embodiment in which a rechargeable battery pack is employed, it comprises at least three tracks for said first, third and fourth conductors.

Nevertheless, it preferably comprises six tracks, the first track being empty, the second track receiving said fourth conductor, the third track receiving said third conductor and the fourth track receiving said first conductor, said slide connector bridging three tracks, a mask being laid over the tracks and exposing or masking the conductors so that in a first position of the slide connector said third and fourth conductors are electrically bridged while in said second position said first and third conductors are electrically bridged.

The reason why the switch preferably comprises six tracks is so that it may be used when said auxiliary device and/or said low power mode are employed. In either case, the fourth, third and first conductors are laid in said second, third and fourth tracks respectively.

In the case of said auxiliary device said sixth conductor is laid in said first track, said slide connector in said first and second positions providing the connections as defined above but in addition, in the second position, or in a third position, electrically bridging said sixth and third conductors. From the foregoing it is apparent that the slide connector must bridge four tracks but it is preferred that two separate and electrically isolated slide connectors be mounted in said switch slide, the first slide connector bridging the first, second and third tracks and the second at least the fourth and fifth tracks, the first conductor extending into said fifth track and said third conductor extending into said fourth track, both of them in the second and/or third positions of the switch, whereby in said second and/or third positions said first and third conductors are electrically bridged by the second slide connector.

In the case of said low power mode of operation, said fifth conductor is laid in said sixth track, said slide connector in said first position providing the connections as defined above but in the second position bridging said first and fifth conductors and in the third position bridging the first and third conductors. From the foregoing it is apparent that the slide connector must bridge five tracks with the first and third connectors extending into the fourth and fifth tracks respectively as may be convenient, but it is preferred that two separate and electrically isolated slide connectors be mounted in said switch slide, the first slide connector bridging at least the second and third tracks and the second slide connector bridging the fourth, fifth and sixth tracks, the first slide connector bridging the third and fourth conductors in said first position of the switch and being isolated in other positions, while the second slide connector in said first position is isolated, in said second position bridges said fifth and first conductors and in said third position bridges said third and first conductors which, in this position of the switch, extend into the fourth and fifth tracks of the switch respectively.

It will be apparent that the culmination of this arrangement is where both an auxiliary device and the low power mode of operation are employed and in which event said sixth conductor lies in said first track, said fourth conductor lies in said second track, said third conductor lies in said third track, and extends into the fourth track in the third position of the switch, said first conductor lies in at least the second switch position in the fourth track, and at least in the second and third switch positions in the fifth track, and said fifth conductor lies in the sixth track, two separate and electrically isolated slide connectors being mounted in said switch slide, the first connector bridging the third and fourth conductors in the first switch position, and the third and sixth conductors in the third, and optionally second, switch positions, and the second connector bridging the first and fifth conductors in the second position and the first and third conductors in the third position.

Where the power tool in question is a hand held vacuum cleaner, the present invention in this specific arrangement is particularly convenient because it makes possible the provision of two models of cleaner with substantially the same components. Given the last described arrangement in which the auxiliary device is an electrically powered, motor driven brush and in which the two suction levels are provided by feeding high or low battery power to the fan impellor motor, a simpler lower grade model can be provided simply by using a narrower conductor strip so that said fifth and sixth conductors, being formed from either edge of a wider conductor strip are therefore omitted, even though the same tool is employed for punching the conductors. Only one slide connector need be used, it being the same as each of the two used in the higher grade model. Otherwise the remaining components of the basic structure of the cleaner are unchanged, (except of course that the battery pack may be smaller and the auxiliary device is omitted).

From the foregoing it will be apparent that another aspect of the invention is that it provides a new and useful switch construction. Indeed, according to this aspect of the invention, a switch comprises a tray of electrically insulative material having linear tracks formed therein to receive at least three conductors laid in at least three of said tracks, a mask of electrically insulative material having windows formed therein, which mask overlays said tray and conductors, the windows exposing selected conductors, and a slide connector of electrically conductive material which is mounted in a switch slide of electrically insulative material, the switch slide and slide connector being arranged to slide over said mask along the line of said tracks so that the connector passes over said windows and electrically interconnects two or more conductors in at least one of different switch positions, characterised in that said slide connector is mountable in said switch slide in different positions across the tracks whereby different electric connections can be effected between the conductors.

Preferably there are at least four tracks in the tray and more than one slide connector is mountable in said switch slide, each connector being electrically isolated from the other and serving to bridge different groups of conductors.

Preferably there are x tracks, and each connector bridges y tracks, the connector being mountable in n positions in said switch slide where n is given by the formula:

$$n=x-y+1.$$

Thus, there may be six tracks in the tray and each slide connector bridges three tracks whereby one or two slide connectors are mountable in said switch slide and, when there is only one slide connector, it is mountable in any of four transverse locations across the switch slide.

Moreover, one or more conductors may lie in two or more tracks in at least one switch position.

BRIEF DESCRIPTION OF THE DRAWINGS

The invention is further described hereinafter, by way of example only, with reference to the accompanying drawings, in which.

DESCRIPTION OF THE PREFERRED EMBODIMENTS

Figure 1:
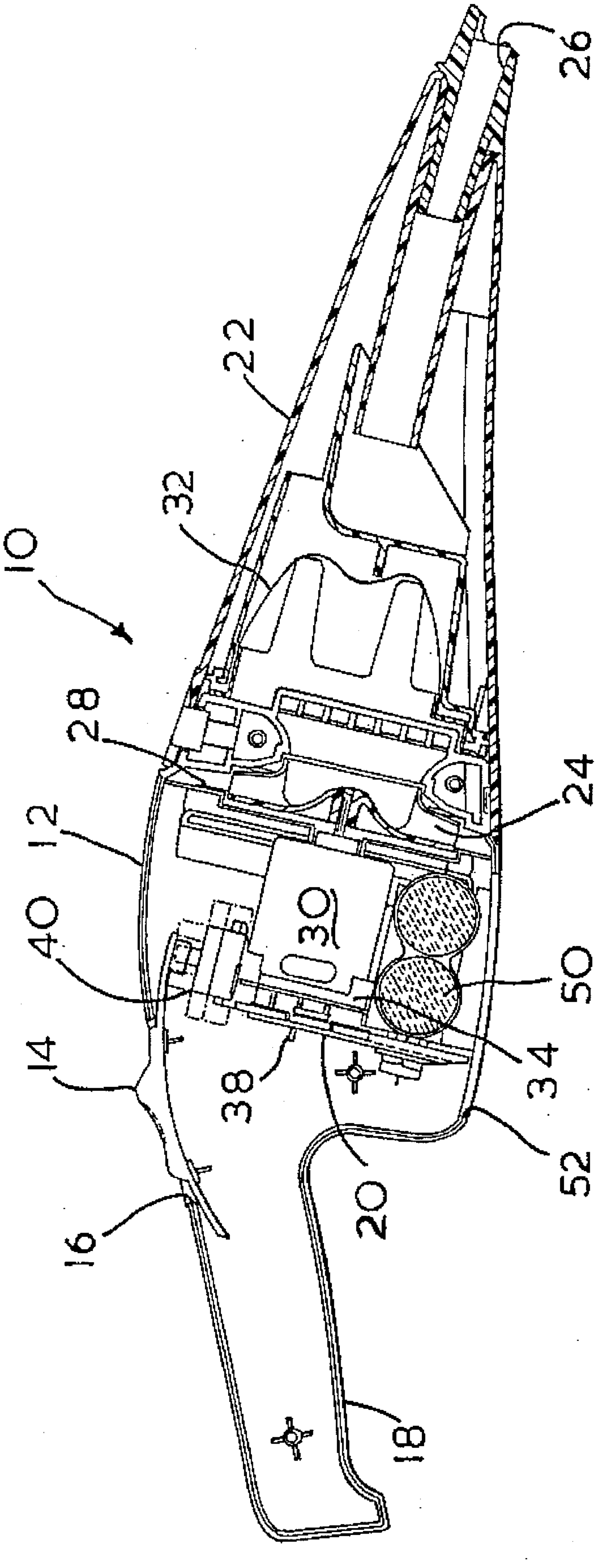
FIG. 1 is a side section through a hand held vacuum cleaner according to the present invention.

In the drawings a hand held vacuum cleaner 10 has a housing 12 mounting a motor and switch carrier 20 which mounts an electric dc motor 30 and switch 40. The switch 40 is operated by a knob 14 located in an aperture 16 in the housing and is manually actuable. The housing forms a handle 18 and has a nozzle 22 attached. The motor 30 is powered by a battery pack 50 and drives a fan impellor 24 which draws air through an end opening 26 in the nozzle 22 and expels same through side openings 28 of the housing. Disposed therebetween is a filter 32 which retains dust and debris sucked through the opening 26.

Within the confines of the nozzle 22 is a collecting means for such dust and debris. Some models of such vacuum cleaners can also be allowed to draw liquids through the nozzle, given that appropriate shields and guards must be provided to prevent liquid contacting the filter. However, such refinements are not the concern of the present invention.

The carrier 20 comprises a plastics or like insulative material Sheet which is located in and by the housing. It has a cylindrical skirt 34 (see also FIGS. 2*a* and *b*) to receive the motor 30 including a central opening 36 through which-the bearing and shaft 38 of the motor at one end thereof are received. The motor 30 is of the type having two electrical terminals projecting from its end received within the skirt 34 and these pass through apertures formed for this purpose in the carrier 20. The carrier 20 has wings 42 for mounting of the carrier in the housing. The carrier has six guides 44 formed in side by side relationship and surrounding the aperture 36 and extending generally from the switch 40 mounted at the top of the carrier 20 to the base thereof.

Figure 2A:
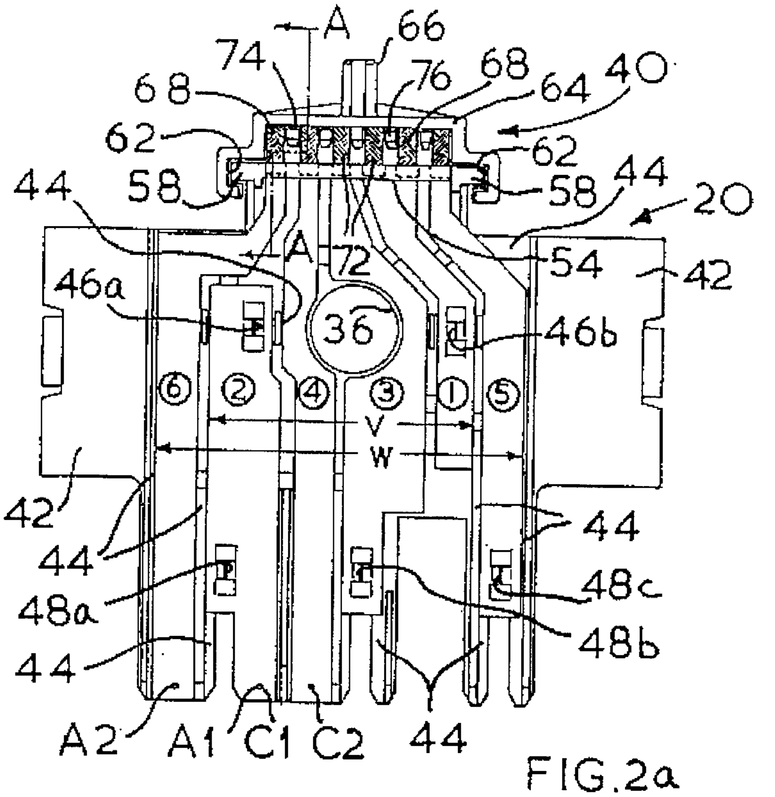
FIGS. 2*a* and *b* are an elevation and side view of a motor and switch carrier for the cleaner of FIG. 1.

Each guide 44 supports and mounts a conductor from a first to a sixth thereof which are formed by punching from a strip of electrically conductive material of width substantially equal to the width W shown in FIG. 2*a*.

The first and second conductors 1, 2 have slits 46 positioned to receive therethrough the terminals (not shown) of the motor 30. The slits 46 are so shaped that on pressing through of the terminals they are gripped by the edges of the slits against the resilience of the material of the conductors so that good electrical connection is assured and further connection by soldering for example is rendered unnecessary.

The second, third and fifth conductors 2, 3, 5 have similar slits 48 adapted to receive terminals (not shown) of the battery pack 50. The battery pack 50 may comprise any number of batteries in a stack, the ends of which are wired to the terminals passing through slits 48 in the second and third conductors 2, 3 while an intermediate point in the stack may be wired to a terminal passing through the slit 48 in the fifth conductor 5. Thus the full voltage of the battery pack is applied across conductors 2, 3 while a lesser voltage is applied across conductors 2, 5.

The terminals of the battery pack 50 are pressed through the slits 48 and are held in a similar manner to the motor terminals. However, it will be apparent that the battery pack can relatively easily be pulled out of engagement with the carrier 20. A normally blanked-off aperture 52 in the base of the housing 12 gives access to the battery pack for removal thereof at the end of the working life of the cleaner and so that the batteries can be disposed of or recycled in an environmentally sound manner.

To enable the battery pack to be recharged from time to time the second conductor 2 has an extension to the base of the carrier 20 where it forms one terminal C1 for connection to a battery charger (not shown). Another terminal C2 is provided on the fourth conductor 4 and both terminals C1, C2 are disposed adjacent the opening 52 in the base of the housing 12. The blanking plate (not shown) positioned in opening 52 has apertures adjacent terminals C1, C2 to receive terminals of the charger which are arranged to contact terminals C1, C2.

A useful auxiliary device for the vacuum cleaner 10 is an electrically powered motor driven brush mounted in a specially adapted nozzle (not shown) for connection to the housing 12. This brush is arranged to beat the surface being cleaned to loosen dust for suction into the nozzle. The brush is arranged to be powered by the battery pack and has conductors running along the base of the nozzle and housing terminating in the region of the base of carrier 20. Thus the extension on the second conductor 2 forms a first terminal A1 for the power brush conductors while a second terminal A2 is formed on the sixth conductor 6.

Figure 7A:
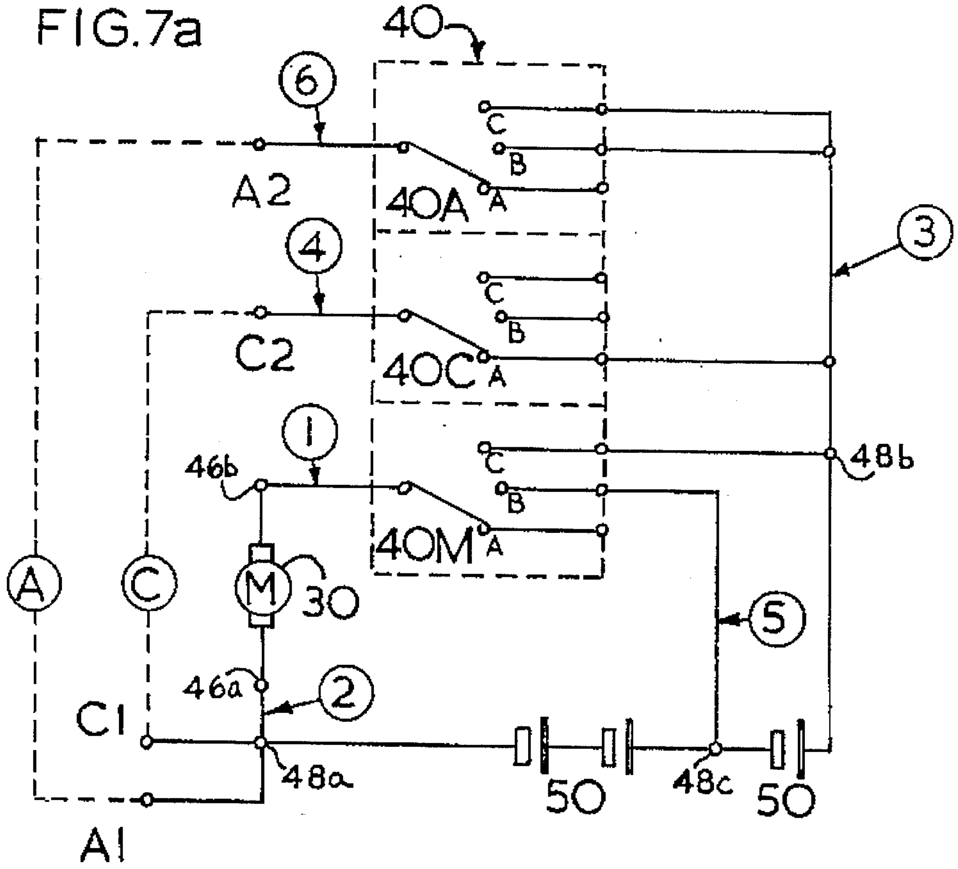
FIGS. 7*a* and *b* are circuit diagrams for a preferred embodiment of the invention.

FIGS. 7*a* and *b* show schematically the circuit diagram for the electrical arrangements of two embodiments of the cleaner 10.

With reference to FIG. 7*a*, the switch 40, as explained further below has three positions. In the first position A, which is "Off", only switch 40C makes any contact so that the batteries 50 may be charged by charger C when connected to terminals C1, C2.

In the second position B, switch 40C is opened and switch 40M connects the motor 30 across just some of the batteries

50 so that it operates in low power mode. The brush A, when provided and connected across terminals A1, A2 is connected across all the batteries 50 by switch 40A. In the final third position C of the switch 40 the switch 40M now connects the motor 30 across the full battery power.

The switch 40 providing the aforementioned functions comprises a tray 54 integral with the carrier 20 and disposed substantially at right angles thereto.

Figure 5:
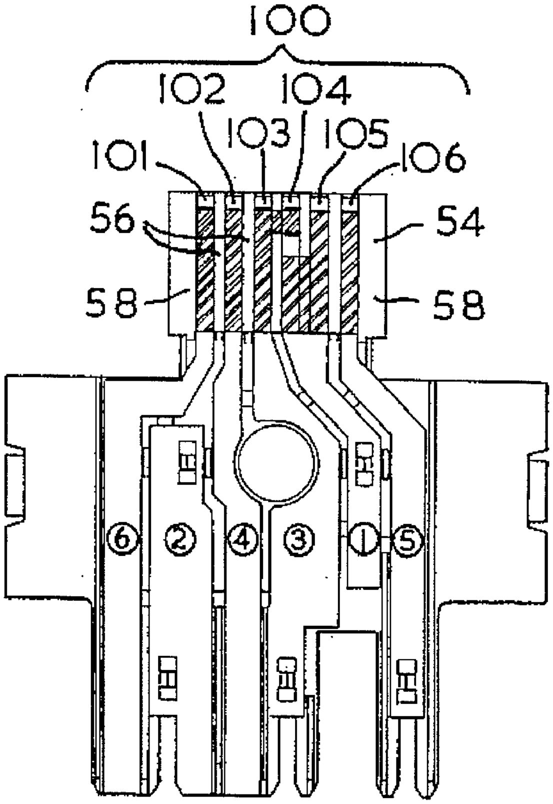
FIG. 5 is an illustration as FIG. 2*a*, but showing schematically the disposition of conductors in the switch.

The tray has six tracks 100 formed thereon to receive the conductors which enter the switch 40 as best illustrated in FIG. 5. Only five of the six conductors enter the switch, the second conductor 2 merely connects the motor 30 to the battery pack 50 and forming terminals A1, C1. However six tracks 100 are required because the third and first conductors, primarily in the third and fifth tracks 103, 105 respectively, share the fourth track 104 between them. The tracks are separated by walls 56 which keep the conductors apart.

Figure 2B:
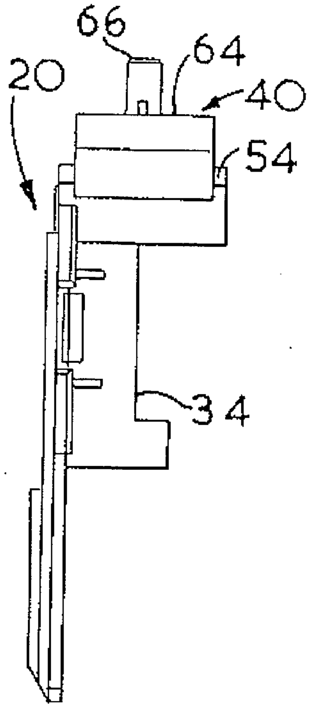
Figure 3A:
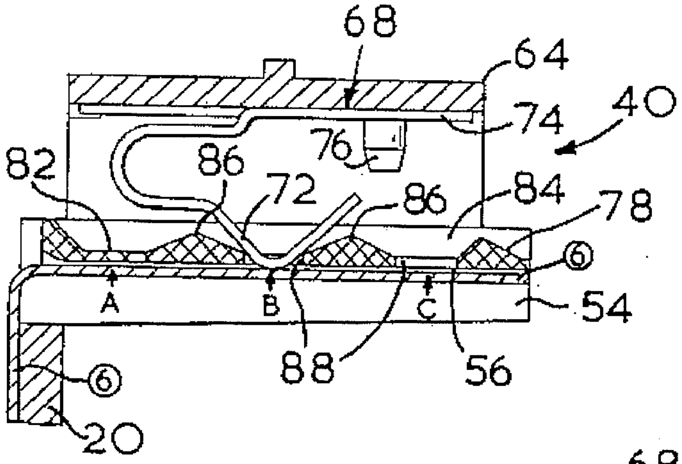
FIGS. 3*a* and *b* are side sections along the line A—A in FIG. 2*a* showing different embodiments of a switch carried on the carrier of FIG. 2.
Figure 3B:
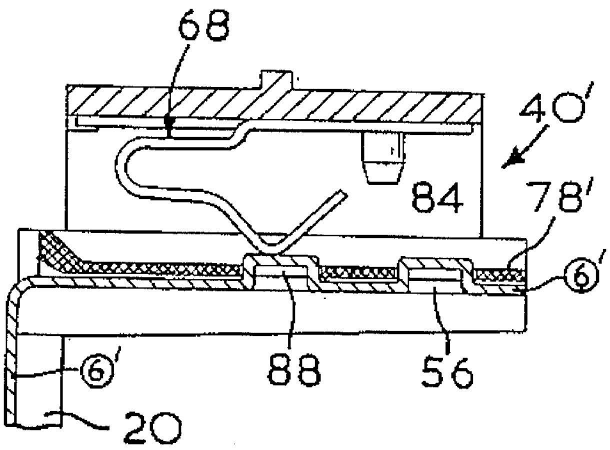
Figure 4A:
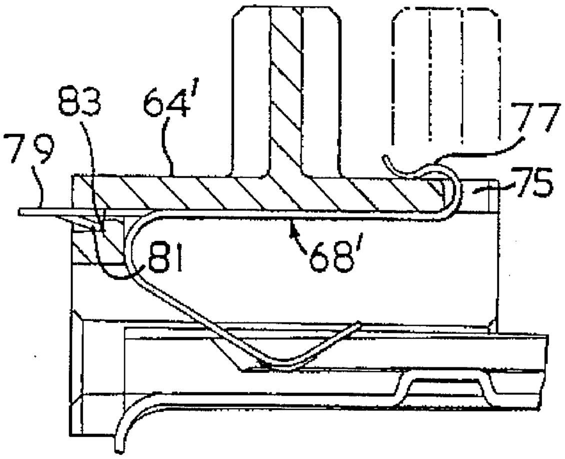
FIGS. 4*a* and *b* are a side section and underneath plan view of another embodiment of switch slide connector according to the invention.
Figure 4B:
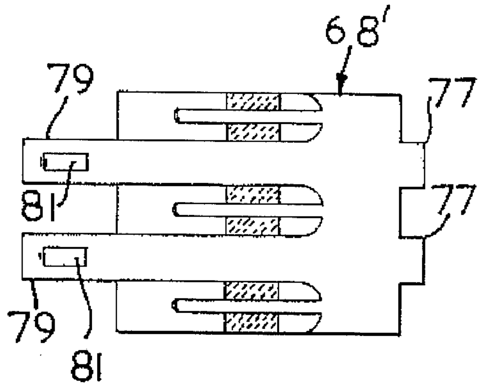

The tray has wings 58 on either side which locate side channels 62 of a switch slide 64 (see FIGS. 2, 3 and 4). The switch slide 64 has a central upstanding pillar 66 to which the knob 14 is connected for sliding the switch slide 64 back and forth along the tray 54 in the direction of the tracks 100 on actuation of the knob 14 by a user of the cleaner 10. The switch slide 64 mounts two slide connectors 68, each comprising three electrical contacts 72 stemming from a bridge 74. The separation of the contacts 72 corresponds with the separation of the tracks 100 and each contact bears against and runs along the conductors 1 and 3 to 6 received in the tray 54. Each connector 68 has two apertures which receive downwardly depending pegs 76 in the roof of switch slide 64, which pegs 76 serve to locate the connectors and constrain them for movement with the switch slide. Indeed the resilience of the connectors 68 and their location by the pegs 76 in the switch 40 is all the fixation they require, although the pegs 76 can be deformed to rivet the connectors in position in the switch slide if desired.

There are five pegs 76, one each above the walls 56 which separate the tracks 100 in the tray 54, the centre peg 76 not in this embodiment being used. However, the reason for its provision is explained further below.

FIGS. 4*a* and *b* illustrate another embodiment of the slide connector 68' and switch slide 64'. Here the pegs 76 are replaced by notches 75 in the switch slide 64' which notches are adapted to receive and locate two clips 77 formed on one end of the slide connector 68'. Furthermore, the slide connector has two tabs 79 provided with catches 81 adapted to latch in detents 83 provided in the switch slide 64'.

Again, for reasons explained further below, the switch slide has five notches 75 and five detents 83 so that two slide connectors 68 can be mounted in the switch slide using two each (that is four in total) of each of the notches 75 and detents 83. The fifth central notch and detent are unused in this arrangement.

Figure 6:
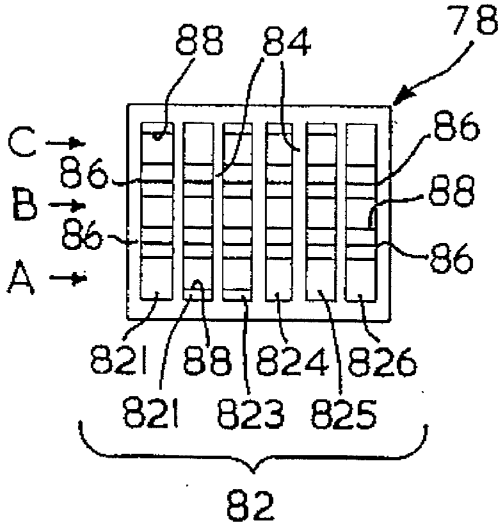
FIG. 6 is a plan view of a switch mask.

In order to provide the switching described with reference to FIG. 7*a* above, the tray 54 is provided with a mask 78 (see FIGS. 3*a*, 4 and 6). The mask 78 comprises a plate of insulative material having six mask tracks 82 defined by intervening walls 84. Two ridges 86 across the tracks 82 divide each track into three switch positions A, B and C. In each switch position A, B, C, each track 82 either has a window 88 in its floor, or not. Where a window is present, the connector 68 (or 68') in that track protrudes through the window and contacts the conductor underneath. Obviously in any given switch position at least two windows are required in the mask tracks 82 in order for a useful electrical connection to be made.

Thus in the first switch position A, there are windows 88 in tracks 822 and 823. These windows are above the fourth and third conductors 4, 3 respectively so that the connector 68 above these tracks bridge those conductors so making the "switch" 40C in FIG. 7*a*. No other windows are provided in this switch position so the two other "switches" 40A and 40M are open in FIG. 7*a*. Thus the switch 40 is "Off" and if the cleaner 10 is connected to a battery charger C, the charger will charge the batteries 50.

In the second switch position B, the two connectors 68 separately bridge the sixth and third conductors 6, 3 and the first and fifth Conductors 1, 5 respectively through the windows 88 provided in the mask 78 above those conductors. Thus "switches" 40A and M in FIG. 7*a* close in their second positions B and in which case the auxiliary device A (if provided) is connected across all the batteries 50 while the motor M is connected across some of the batteries 50 and operates in a low power mode. That is to say, the switch 40 is "On-I" and it is to be noted that, since no window is provided in track 822 above the fourth conductor 4, the charger is isolated by switch 40C being open, whether or not the charger is connected to the terminals C1, C2. This of course prevents the charger directly driving the motor M or auxiliary device A which, in all practical embodiments, it would not be designed to do.

Finally in the third switch position C, this corresponds with switch position B except that here the window 88 in mask track 824 is not above the first conductor 1, as it is in the second switch position, but is above the third conductor 3 which, in this switch position crosses the tracks 103, 104 in the tray 54. In this position, therefore, the connector above mask tracks 824, 5, 6 bridges the third and first conductors so that "switch" 40M in FIG. 7*a* goes to its third position C connecting full battery power across the motor M. The switch 40 is thus "On-II".

FIG. 3*b* shows a variation in the mask and conductors underneath, in that the mask 78' is flat, not having the ridges 86, and instead the conductors (6' in the drawing) are formed to protrude through the windows 88 where these are provided. It is apparent that the mask 78 of FIG. 3 provides discrete switch positions in that the connectors 68 snap into each position after scaling each ridge 86. The switch 40 therefore provides its own detent mechanism for locating the switch in its three positions. However, it will also be appreciated that slight movements of the switch slide 64 could disconnect any one or more connectors 72 from their conductors. The embodiment of FIG. 3*b* provides for a longer travel of the switch slide before contact is broken (thus allowing for greater tolerances to be employed) but it does require a separate detent mechanism to locate the switch in each switch position. This could however be provided with the knob 14 in the housing 12.

While six tracks are not absolutely necessary to achieve the foregoing results, and nor are two separate connectors 68, the advantage with this arrangement is that it can also be employed on a low-cost cleaner 10 which has no auxiliary device and where low power operation is not required (or, more accurately, where fewer batteries are provided and nothing more than the "low" power operation of the above-described cleaner is available).

Here, a strip of conductive material of width V is used instead of width W (see FIG. 2*a*) to form the conductors. Thus it is apparent that the fifth and sixth conductors are lost. Secondly, instead of two connectors 68 only one is employed, located in the switch slide 64 by its middle and middle-left (in FIG. 2*a*) pegs 76 so that the connector is positioned above tracks 102,3,4 and the fourth, third and first conductors 4, 3, 1 received in said tracks respectively. Otherwise the components are the same, including the mask 78. A similar provision is given by the central notch 75 and detent 83 of the FIGS. 4*a* and *b* embodiment, so that a single slide connector 68' can be employed in the same position above tracks 102, 3, 4 of the tray 54 and the conductors received therein.

Figure 7B:
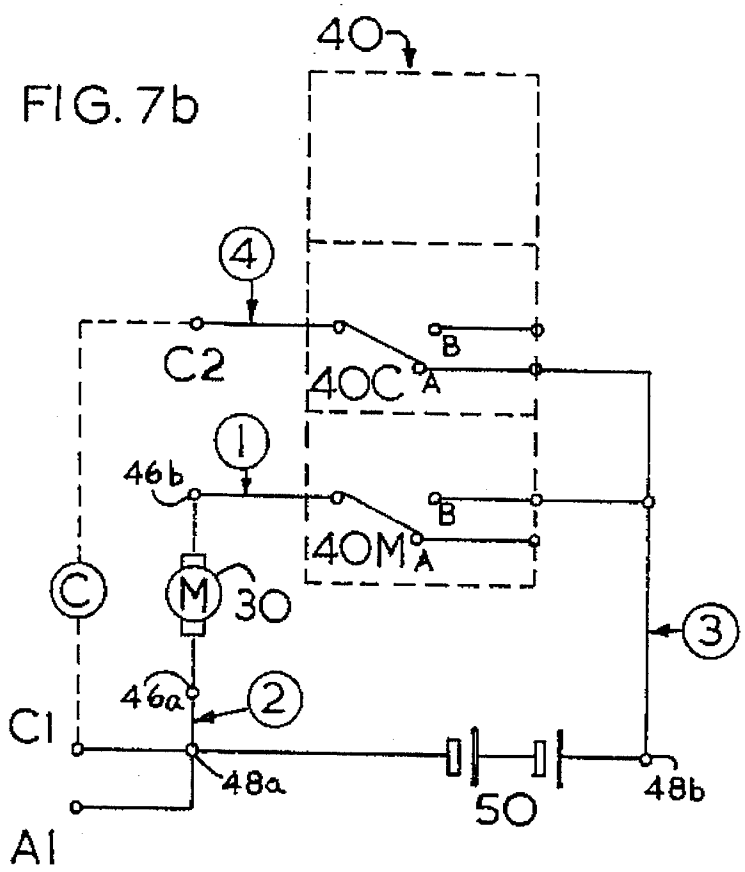

Moreover, the switch 40 is here only a two position switch. Referring to FIG. 7*b* in which the conductors 5, 6 are now missing, the first switch position A is "Off", where switch 40C is closed and switch 40M is open while the second switch position is "On", where switch 40C is open and switch 40M is closed. Thus in the first switch position a charger C when connected across terminals C1, C2 charges the batteries 50 with the motor isolated, while in the second position the charger is isolated while the motor M is connected across the batteries 50 and the cleaner is in operation. These switching functions are provided with the same mask 78 with the connector 68 disposed above mask-tracks 822, 3,4. In the first switch position (A in FIG. 6) windows 88 in the tracks 822, 823 allow the connector 68 to bridge the fourth and third conductors 4, 3, while in the second position B, windows in tracks 823, 824 allow the connector to bridge the third and first conductors 3, 1. To prevent the switch slide going to the third switch position in this configuration the aperture 16 in the housing 12 receiving the knob 14 is simply reduced in size.

Figure 11:
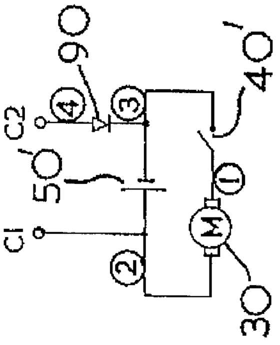
FIG. 11 is the circuit diagram for the embodiment of FIG. 8.
Figure 10:
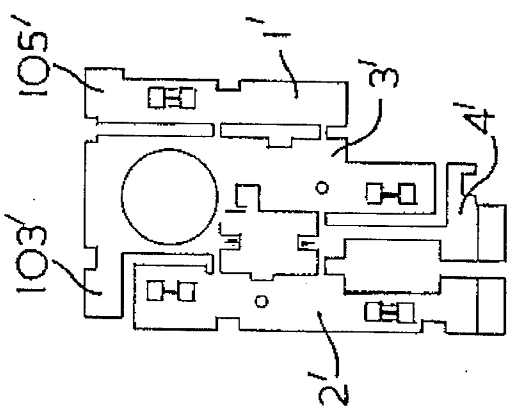
FIG. 10 is a front view of the conductors for the embodiment of FIG. 8.
Figure 8C:
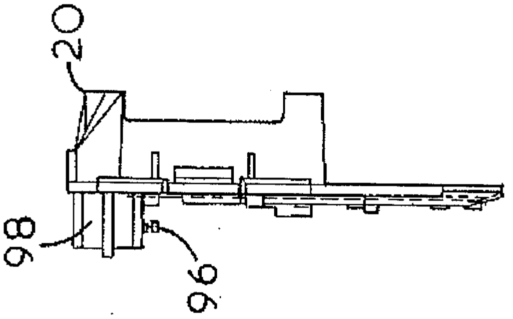
FIGS. 8*a*, *b* and *c* are different views of another embodiment of motor and switch carrier according to the invention.
Figure 8B:
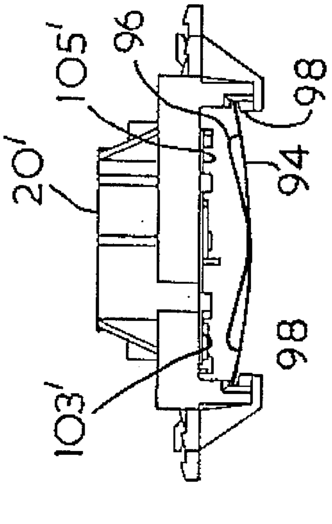
Figure 8A:
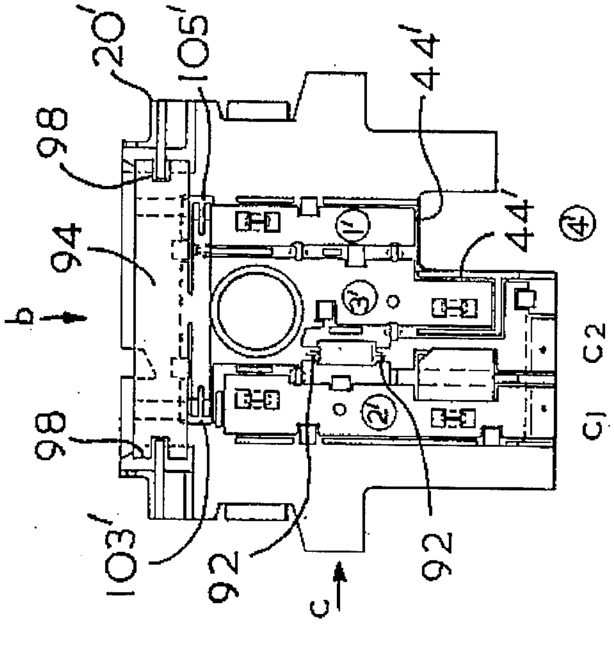

FIG. 8 shows a simplified version of the motor and switch carrier 20. Here, like parts have the same reference numerals except with a prime. Thus, carrier 20' has four guides 44' having conductors 1', 2', 3' and 4'. Conductor 4' is merely an extension of conductor 3 (i.e. it is permanently connected thereto) but has an intervening diode 90 received in tags 92 formed on the conductors 3', 4' (see also the circuit diagram in FIG. 11). The diode 90 prevents battery 50' from possibly being short-circuited across terminals C1, C2 by the user. The diode acts as a one-way valve allowing current only in the charging direction for battery 50'. The same safety arrangement can also be incorporated in conductor 4 of the previous embodiment of this invention.

Figure 9A:
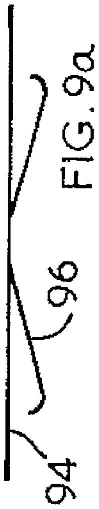
FIGS. 9*a* and *b* are different views of a switch element for the embodiment of FIG. 8.
Figure 9B:
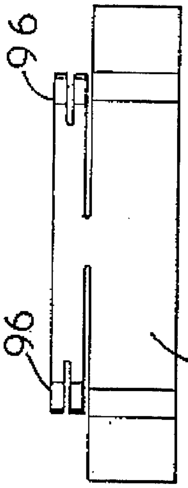

The present arrangement is a low cost option, and here the switch 40' is merely a snap action on-off switch comprising a spring strip 94 (see FIG. 9) and spring contacts 96. The spring strip 94 is bent and retained between posts 98 on the carrier 20'. A slide knob (not shown) similar to the knob 14 of the previous embodiment activates the spring strip 94 between the position shown in FIG. 8*b* and the corresponding position with the spring strip bent in the other direction. It is apparent that, once the spring strip is pushed beyond its threshold point from one position it snaps into the other position. In the position shown in FIG. 8*b*, the contacts 96 are spaced from terminals 103', 105' on the conductors 3', 1' respectively. However, when snapped into its other position, the contacts 96 touch the terminals 103', 105' and serve electrically to bridge the conductors 3', 1' and so make the switch 40' in the circuit of FIG. 11. As long as there is charge in the battery 50', the motor 30 will run. Of course, in this embodiment, it would also be possible, if the battery 50' was discharged, to run the motor from the charger if connected across terminals C1, C2. In this event, the charger must be protected against drawing too much current for it to handle. This is not, of course, a problem with the embodiment described above where the terminals C1, C2 are isolated when the switch 40 is made In conclusion therefore, the present invention allows essentially the same components and, equally importantly, the same assembly routines to be employed to construct different models of the same basic power tool. Moreover, the removal of flexible wiring minimises the need for human intervention in assembly of the tool. While the foregoing description relates to a hand held vacuum cleaner it will be apparent to those skilled in the art that the principles of the present invention could be employed in other power tools. This is particularly the case for the arrangement of the switch 40 which could be employed in any electrical environment.

Use of ordinal numbers in the foregoing description or following claims is primarily for identification purposes only and is not intended, unless otherwise stated or the context otherwise requires, to indicate the numbers of items referenced by said numbers which are present in the described or defined arrangement or their relative dispositions. Thus a sixth conductor or track, for example, might be employed without a fifth and may be disposed between a second and fourth.

What is claimed is:

1. A power tool comprising:

a housing;

a power source in the housing;

a motor and switch carrier member of insulating material disposed in the housing and having apertures therein and guides formed in side-by-side relation on one side of said carrier;

a motor mounted on the other side of said carrier, the motor having electrical terminals which protrude through said apertures to said one said;

a switch mounted on said carrier, said switch comprising a tray integral with said carrier and disposed substantially normally thereto, said tray including a plurality of axially extending tracks; and first, second and roller conductors which are punched from a strip of electrically conductive material and which lie in said guides in substantially the same disposition as they lay in said strip before punching, said motor terminals being connected to said first and second conductors, and said first conductor leading to said switch, said second conductor leading to said power source, and said third conductor connecting said switch and said power source, said first and third conductors lying in said tracks of said tray.

2. The power tool of claim 1 wherein said first and second conductors are slit and through which slits said terminals of the motor are pressed to complete the connections therebetween.

3. The power tool of claim 2 wherein the switch includes tracks on said carrier and said first and third conductors pass into said tracks and form terminals of the switch, and wherein a slide connector is disposed in the switch, which connector makes and breaks electrical connection between said first and third conductors.

4. The power tool of claim 3 further comprising a switch slide of insulating material wherein said carrier has means for slidably mounting said switch slide, and wherein said slide connector is fixed in said switch slide, said switch slide being slidable along a line generally perpendicular with the line of said first and third conductors.

5. The power tool of claim 1 wherein said power source is a pack of rechargeable batteries and in which said motor is a dc motor.

6. The power tool of claim 5 wherein a fourth conductor is provided in a further guide in the carrier and which is punched from the same strip, which conductor is disposed between the switch and an aperture in the housing for receiving terminals of a battery charger, said second conductor having a branch to said aperture, and said slide connector in a first position thereof electrically bridging said third and fourth conductors and isolating said first conductor and in a second position thereof electrically bridging said first and third conductors and isolating said fourth conductor.

7. The power tool of claim 6 wherein said second conductor leads to an end of the stack of batteries forming said pack while said third conductor leads to an intermediate point in said stack, a fifth conductor being provided in a yet further guide in the carrier and being punched from the same strip, which fifth conductor is disposed between said switch and the other end of said battery stack, the switch having a third position in which said first and fifth conductors are electrically bridged.

8. The power tool of claim 7 incorporating an auxiliary device powered by said power source and having first and second terminals, wherein there is provided a sixth conductor disposed in a still further guide in the carrier and being punched from the same strip, which conductor is disposed between said switch and said first terminal, said second terminal thereof leading to said second conductor, the switch having a fourth position in which said sixth and third conductors are electrically bridged to power said auxiliary device.

9. The power tool of claim 8 wherein said switch comprises six tracks, the second track receiving said fourth conductor, the third track receiving said third conductor and the fourth track receiving said first conductor, said slide connector bridging three tracks, a mask being laid over the tracks and exposing or masking the conductors so that in a first position of the slide connector said third and fourth conductors are electrically bridged, while in said second position said first and third conductors are electrically bridged, and wherein said sixth conductor is laid in the first track, said slide connector in said second and/or third positions electrically bridging said sixth and third conductors.

10. The power tool of claim 9 wherein two separate and electrically isolated slide connectors are mounted in said switch slide, the first slide connector bridging the first, second and third tracks and the second at least the fourth and fifth tracks, the first conductor extending into said fifth track and said third conductor extending into said fourth track, both of them in the second and/or third positions of the switch, whereby in said second and/or third positions of the switch, said first and third conductors are electrically bridged by the second slide connector.

11. The power tool of claim 6 wherein said second and third conductors lead to opposite ends of the stack of batteries forming said pack, a fifth conductor being provided in a yet further guide in the carrier and being punched from the same strip, which fifth conductor is disposed between said switch and an intermediate point in said battery stack, the switch in said second position thereof electrically bridging said first and fifth conductors while in a third position thereof electrically bridging said first and third conductors.

12. The power tool of claim 11 incorporating an auxiliary device powered by said power source and having first and second terminals, wherein there is provided a sixth conductor disposed in a still further guide in the carrier and being punched from the same strip, which conductor is disposed between said switch and said first terminal, said second terminal thereof leading to said second conductor, the switch in said third position electrically bridging said sixth and third conductors to power said auxiliary device, and wherein said power tool is a hand held vacuum cleaner and said auxiliary device is an electrically powered, motor driven brush mounted on the end of a nozzle of the vacuum cleaner.

13. The power tool of claim 11 wherein said switch comprises six tracks, the second track receiving said fourth conductor, the third track receiving said third conductor and the fourth track receiving said first conductor, said slide connector bridging three tracks, a mask being laid over the tracks and exposing or masking the conductors so that in a first position of the slide connector said third and fourth conductors are electrically bridged while in said second position said first and third conductors are electrically bridged.

14. The power tool of claim 13 in which said fifth conductor is laid in the sixth track, said slide connector in said second position bridging said first and fifth conductors and in said third position bridging the first and third conductors.

15. The power tool of claim 14 wherein two separate and electrically isolated slide connectors are mounted in said switch slide, the first slide connector bridging the first, second and third tracks and the second at least the fourth and fifth tracks, the first conductor extending into said fifth track and said third conductor extending into said fourth track, both of them in the second and/or third positions of the switch, whereby in said second and/or third positions of the switch, said first and third conductors are electrically bridged by the second slide connector, and wherein said sixth conductor lies in said first track, said fourth conductor lies in said second track, said third conductor lies in said third track, and extends into the fourth track in the third position of the switch, said first conductor lies, in at least the second switch position, in the fourth track, and at least in the second and third switch positions, in the fifth track, and said fifth conductor lies in the sixth track, the six tracks lying side by side in their numbered order and two separate and electrically isolated slide connectors being mounted in said switch slide, the first connector bridging the third and fourth conductors in the first switch position, and the third and sixth conductors in the third, and optionally second, switch positions, and the second connector bridging the first and fifth conductors in the second position and the first and third conductors in the third position.

16. The power tool of claim 14 wherein two separate and electrically isolated slide connectors are mounted in said switch slide, the first slide connector bridging at least the second and third tracks and the second slide connector bridging the fourth, fifth and sixth tracks, the first slide connector bridging the third and fourth conductors in said first position of the switch and being isolated in other positions, while the second slide connector in said first position is isolated, in said second position bridges said fifth and first conductors and in said third position bridges said third and first conductors which, in this position of the switch, extend into the fourth and fifth tracks of the switch respectively.

17. The power tool of claim 1 which is a hand held vacuum cleaner wherein the housing has a handle and mounts a nozzle having an opening at one end in communication via a filter with a fan impellor driven by the motor, the nozzle including collecting means to receive and retain dust debris or liquid drawn through the nozzle position.

* * * * *